Feb. 15, 1949. L. S. BONNELL 2,461,958
TREATING HYDROCARBON FLUIDS
Filed Dec. 14, 1944 3 Sheets-Sheet 1

Leonard S Bonnell Inventor
By P. L. Young Attorney

Feb. 15, 1949. L. S. BONNELL 2,461,958
TREATING HYDROCARBON FLUIDS
Filed Dec. 14, 1944 3 Sheets-Sheet 3

Leonard S Bonnell Inventor
By P. L. Young Attorney

Patented Feb. 15, 1949

2,461,958

UNITED STATES PATENT OFFICE 2,461,958

TREATING HYDROCARBON FLUIDS

Leonard S. Bonnell, Westfield, N. J., assignor to Standard Oil Development Company, a corporation of Delaware Application December 14, 1944, Serial No. 568,128

4 Claims. (Cl. 196—52)

This invention relates to treating hydrocarbon fluids, and more particularly, relates to treating hydrocarbon fluids in the presence of catalyst or contact material in divided form.

In the catalytic conversion of hydrocarbons, some hydrocarbon stocks are more easily catalytically cracked or converted than other stocks, and also some hydrocarbon stocks deposit less coke or carbonaceous material on the catalyst or contact particles for the same degree of conversion.

For example, in the catalytic cracking of hydrocarbons, virgin gas oils are more easily catalytically cracked than cycle gas oil or other refractory stocks. Also, in the catalytic cracking of hydrocarbons, virgin gas oil deposits less coke or carbonaceous material on the catalyst or contact particles than a residual stock for the same or less degree of conversion.

The catalytic cracking of a petroleum oil produces compounds which are lower boiling than the charge stock and also compounds which are of higher boiling range. The latter compounds are similar in nature to a residual or extremely high-boiling oil, and this extremely high-boiling material is here designated as polymer oil since it results from the polymerization or chemical combination of lower-boiling unsaturated products of the cracking reaction to form high-boiling compounds. In the fluid catalyst process, it is desirable to return this aforementioned polymer oil to the cracking zone for it contains catalyst particles that can be recovered and returned to the process. It has been found in commercial practice, however, that such disposal of this oil causes an undue amount of coke or carbonaceous material to be deposited on the catalyst particles, and as a result, capacity of the cracking unit suffers. The deleterious effect of the polymer oil described above is minimized or substantially eliminated in my process.

In present commercial fluid catalyst cracking units, the polymer oil mixed with fresh virgin charge stock is introduced into the cracking zone in direct contact with the entering regenerated catalyst. The polymer oil has a greater tendency to decompose to carbon than has the fresh charge and consequently the efficiency of the catalyst in aiding decomposition of the fresh charge is impaired considerably due to the deposition on the catalyst particles of coke or carbonaceous material which originates from the polymer oil. To avoid or minimize the action of the polymer oil in fouling the active catalyst, it is proposed, according to my invention, that the most active catalyst be introduced into the reaction zone in contact only with the fresh charge stock and that the polymer oil be introduced into that portion of the reaction zone containing the least active catalyst, preferably in countercurrent flow.

According to one form of my invention, fresh regenerated catalyst or contact particles are used for cracking virgin stocks or less refractory stocks in a first contacting zone and spent or partially spent catalyst or contact particles from the first zone are passed to a second contacting or conversion zone with or without some added hot regenerated catalyst particles for cracking or converting a more refractory stock, such as cycle gas oil, polymer oil, residual stock, etc.

The cracked vaporous reaction products from the second conversion zone are passed to the first conversion zone for further cracking with the more active catalyst or contact particles. Spent catalyst or contact particles are withdrawn from the second cracking or conversion zone, regenerated in a regeneration zone and returned to the first cracking or conversion zone.

According to another form of my invention, different types of catalyst or contact particles are used in the two conversion or contacting zones and the different catalyst or contact particles are separately regenerated. The cracked or converted vaporous reaction products from the second zone, using the less active catalyst and more refractory stock, are passed to the first reaction or conversion zone for further cracking or conversion.

In another form of my invention a single reaction vessel is provided with two conversion or contacting zones and the catalyst or contact particles flow downwardly countercurrent to the upflowing hydrocarbons in vapor form to be converted or cracked. The less refractory hydrocarbon stock is introduced into one reaction or contacting zone formed in the upper portion of the reaction vessel to contact hot freshly regenerated catalyst. The more refractory stock is introduced into the other reaction or contacting zone formed in the bottom portion of the reaction vessel to contact spent or partially spent catalyst or contact particles flowing down from the first contacting or reaction zone. The cracked or converted vaporous reaction products from the second conversion or cracking zone pass upwardly to the first cracking or conversion zone for further cracking or conversion.

With my invention the total coke or carbonaceous material deposited on the catalyst or contact particles is minimized.

Figure 1:
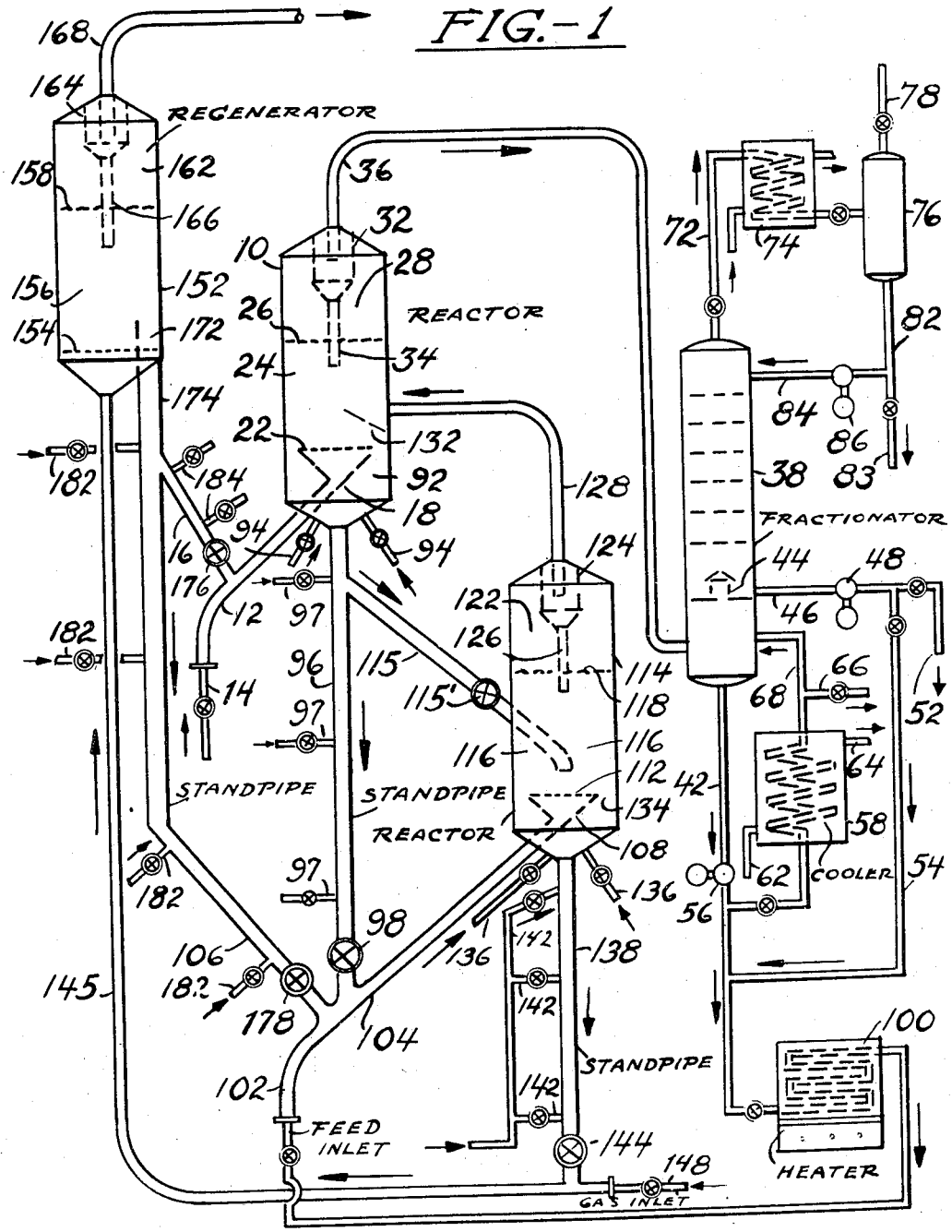
Fig. 1 represents one form of apparatus for carrying out my invention.

Referring now to Fig. 1 of the drawing, the reference character 10 designates a first reaction or contacting zone provided with an inlet line 12 into which hot less refractory hydrocarbon vapors are introduced through line 14 and hot regenerated catalyst particles which are most active are introduced through line 16. The feed stock is preferably in vaporized form but in some cases may be partly liquid and partly vapor or substantially all preheated liquid. The hydrocarbon feed stock may comprise gas oil distillate obtained by distilling a crude petroleum oil at atmospheric pressure, or a high-boiling oil from the same source obtained by distilling at reduced pressure, or a similar material resulting from deasphalting a crude petroleum oil, or a crude petroleum oil.

In the catalytic cracking of hydrocarbons, the catalyst may be an acid-treated bentonite clay, synthetic silica alumina gel or synthetic silica magnesia gel, or other suitable cracking catalysts. The catalyst is preferably in divided form and the particles may have a size between about 200 and 400 standard mesh but substantially coarser particles may be used. For catalytic cracking of hydrocarbons, the amount of catalyst and oil fed to the reactor 10 may vary between about 2 lbs. of catalyst to one of oil to 30 lbs. of catalyst to one of oil.

The mixture of catalyst particles and hydrocarbon feed passes through line 12 into conical feed member 18 provided with a horizontally arranged perforated plate or grid member 22. The conical inlet member 18 and grid member 22 are arranged in the bottom portion of the reaction vessel 10.

The velocity of the vapors flowing upwardly through the reaction vessel 10 is selected to maintain the catalyst or contact particles as a fluidized dry dense liquid-simulating mixture 24 having a level indicated at 26. The mixture is maintained in a turbulent and agitated condition to insure good contact between the vapors and the particles. The velocity of the vapors passing upwardly through the reaction vessel may vary between about 0.3 ft./second and 2 ft./second. With a velocity of about 1 ft./second and with a catalyst of the type described above, the density of the fluidized mixture may vary between about 15 lbs./cu. ft. and 30 lbs./cu. ft.

Above the dense phase or mixture 24 is a less dense mixture or dilute phase 28 which comprises vaporous reaction products containing entrained catalyst particles. The vaporous reaction products are passed through a separating means 32 which may be arranged in the upper portion of the reaction vessel 10 to separate most of the entrained solid particles from the reaction vapors. The separated solid particles collecting in the separating means 32 are returned to the dense bed or mixture 24 through return pipe or dip leg 34 which extends below the level 26 of the fluidized mixture in the reaction vessel 10.

The vaporous reaction products pass overhead through line 36 and still contain some entrained catalyst or contact particles. Additional separating means may be provided to separate an additional amount of catalyst particles from the vapors. The reaction products in vapor form are introduced into the bottom portion of a fractionating tower 38 for separating gasoline constituents from gases and higher boiling constituents. The higher boiling constituents are condensed and during condensation the entrained catalyst particles are precipitated from the vapors and are carried to the bottom of tower 38 along with the condensate collecting therein. The condensate oil containing the catalyst particles as well as the polymer oil is withdrawn from the bottom of the fractionating tower 38 through line 42 and forms at least part of the refractory stock for the second reaction zone presently to be described. The polymer oil has a low A. P. I. gravity of about 12–15°.

A trap-out tray 44 is provided in the fractionating tower 38 for separating medium boiling condensate oil or cycle oil having a final boiling point of, for example, 600–750° F. which may be withdrawn through line 46 by pump 48 and withdrawn from the system as at 52 or may be in part or all recycled through line 54 to the line 42 for passage to the second reaction zone.

At least a portion of the bottoms from the fractionating tower 38 withdrawn through line 42 is passed by pump 56 through heat exchanger 58 having an inlet 62 and an outlet 64 for the circulation of a heat exchange medium. The cooled bottoms may be in part withdrawn from the system through line 66 and at least a part of the cooled bottoms is returned to the bottom portion of the fractionating tower 38 through line 68 for condensing higher boiling constituents from the vaporous reaction products introduced into the fractionating tower 38 through line 36.

Vapors leave the top of the fractionating tower 38 through line 72 and are passed to a condenser 74 for condensing normally liquid hydrocarbons. The cooled mixture is passed to a separator 76 for separating gases from liquid, the gases passing overhead through line 78. Liquid withdrawn from the separator 76 contains gasoline constituents and is withdrawn through lines 82 and 83 and at least a part thereof is returned to the top of the fractionating tower 38 through line 84 by pump 86 as reflux liquid.

Returning now to the first reaction vessel 10, provision is made for the removal of spent or fouled catalyst particles from the reaction vessel 10. During the catalytic cracking or conversion of hydrocarbons, coke or carbonaceous material is deposited on the catalyst or contact particles and it is necessary to regenerate the catalyst or contact particles before using them in another contacting or reaction step. The major portion of the spent or fouled catalyst particles is removed as a dense mixture from the lower portion of the fluidized bed or mixture 24 and is preferably passed down through annular zone 92.

Aerating lines or fluidizing lines 94 are provided for the bottom portion of the reaction vessel 10 for maintaining the solid particles in a fluidized liquid-like condition.

The fluidized spent or fouled catalyst particles are flowed into a standpipe 96 provided with fluidizing lines 97 for maintaining the catalyst or contact particles in a fluidized liquid-like condition so that they produce a hydrostatic pressure at the base of the standpipe 96. The hydrostatic pressure at the base of the standpipe 96 also includes the pressure developed by the fluidized bed or mixture 24.

The lower portion of the standpipe 96 is provided with a control valve 98 for controlling the rate of withdrawal of particles from the standpipe 96.

According to my invention, the partly spent or fouled catalyst or contact particles are used in another reaction zone or treating zone for converting or cracking the cycle stock or polymer oil separated during the fractionation in the fractionating tower 38. The polymer oil contained in the cycle oil is more refractory than the virgin feed stock and during cracking or conversion lays down more coke or carbonaceous material than the fresh feed stock. According to my invention, the more refractory stock, including the polymer oil, is separately treated in a separate reaction zone. Instead of using the polymer oil from the fractionating tower 38, other refractory stocks or residual oils which deposit more coke or carbonaceous material than fresh feed may be used.

The more refractory hydrocarbon stock is passed through line 42 and heater 100 to vaporize the oil and the vapors are then passed through line 102 into line 104 where the vapors are mixed with the spent or fouled catalyst from standpipe 96. Preferably some hot regenerated catalyst is introduced into line 104 from standpipe 106, hereinafter to be described in greater detail, to aid complete decomposition of the polymer oil so that it will not accumulate in the cracking unit.

The mixture of solid particles and refractory stock is passed through line 104 into conical inlet member 108 provided with a horizontally arranged perforated plate or grid member 112 and then into second reaction zone or vessel 114. The grid member 112 acts to distribute evenly the solid particles and vapors across the area of the reaction vessel 114. The inlet conical member 108 and the grid member 112 are arranged in the lower portion of the second reaction vessel 114.

Instead of passing all the spent catalyst through standpipe 96, I pass part of it directly into vessel 114 above grid member 112 through by-pass standpipe 115 communicating with the upper portion of standpipe 96 and having a control valve 115'. This renders the unit more flexible by permitting changes in the amount of regenerated catalyst which can be introduced from line 106 into line 104.

The velocity of the upflowing vapors in the reaction vessel 114 is selected to maintain the solid particles as a dense fluidized liquid-simulating mixture 116 similar to that above described in connection with the first reaction vessel 10. The fluidized mixture has a level indicated at 118.

Above the dense mixture 116 is a dilute suspension or dilute phase 122 which comprises vaporous reaction products containing entrained catalyst or contact particles. The vapors may be passed through separating means 124 for separating a large part of the entrained solid particles from the vaporous reaction products, although this separating means may be omitted, if desired, since separating means 32 in vessel 10 will serve to recover fine catalyst particles emerging from vessel 114.

The separated catalyst or contact particles are returned to the dense bed or mixture 116 through dip leg or return pipe 126. The vaporous reaction products pass overhead through line 128 and are introduced into the dense bed or mixture 24 in the first reaction zone or vessel 10 below the level 26 therein. Preferably a baffle 132 which extends upwardly at an angle to the inner wall of vessel 10 is arranged in said vessel 10 below the inlet of the line 128 to prevent vaporous products emerging therefrom becoming entrained to any appreciable extent in the catalyst stream flowing downward through the annulus 92.

The temperature in the second reaction vessel 114 is about 800° F. to 950° F. The latter temperature is more of the preferred order of magnitude to make possible fairly complete conversion or cracking of the more refractory stock into useful products. The cracked vapors pass overhead through line 128 into the first reaction vessel 10 in which the temperature is about 900° F. to 1050° F. The cracked vapors from the second reaction vessel 114 are contacted with more active catalyst in the first reaction zone or vessel 10 to further crack the products from the second reaction vessel.

The amount of catalyst used in the second reaction zone 114 may vary between about 20 parts of catalyst to one of oil by weight to 50 parts of catalyst to one of oil by weight. This catalyst includes at least part of the catalyst from standpipe 96 and the regenerated catalyst from standpipe 106.

The spent or fouled catalyst or contact particles are withdrawn from the bottom portion of the dense bed or mixture 116 in the second reaction zone or vessel 114 and passed through an annular stripping section or zone 134. Fluidizing gas or aerating gas, such as steam, is introduced into the bottom portion of the reaction vessel 114 through line or lines 136 to maintain the solid particles in a fluidized liquid-simulating condition. Enough gas may be added at these points to act as stripping gas in the stripping zone 134.

The fluidized solid particles are withdrawn from the bottom of the reaction vessel 114 and passed into standpipe 138 provided with fluidizing lines 142 for maintaining the solid particles in a fluidized or liquid-like condition in the standpipe 138. The standpipe 138 at its lower portion is provided with a control valve 144 for controlling the rate of withdrawal of catalyst particles from the second reaction zone 114. The fluidized particles in the standpipe 138 and in the dense bed 116 in the second reaction zone 114 produce hydrostatic pressure at the base of the standpipe 138 which aids in moving catalyst through line 145 when air or other gas is introduced in line 148 to provide the necessary lifting effect to raise the catalyst into regenerator vessel 152.

The spent catalyst particles are passed from standpipe 138 into one end of the line 145 where they are mixed with a regenerating gas, such as air or other oxidizing gas introduced through line 148. The less dense mixture is passed through line 145 into the bottom portion of the regeneration zone or vessel 152 provided with a perforated grid or plate member 154 arranged in the bottom portion thereof. The velocity of the regenerating gas is selected to maintain the particles undergoing regeneration as a dense fluidized mixture 156 having a level indicated at 158. The particles are maintained in a liquid-simulating condition and are in a turbulent and agitated condition to insure good contact between the solid particles and the regenerating gas. During regeneration in zone 152, the temperature is between about 1050° F. and 1200° F.

Above the dense bed or mixture 156 is a dilute suspension or dilute phase 162 which comprises hot regeneration gases containing entrained catalyst or contact particles. To remove a large part of the entrained catalyst particles, the hot regeneration gases are passed through separating means 164 preferably arranged in the upper portion of the regeneration vessel 152. The separated regenerated entrained particles are returned by dip leg or return pipe 166 to the dense bed or mixture 156 below the level 158 therein.

Hot regeneration gases pass overhead from the separating means 164 through line 168. The hot regeneration gases may be passed through additional separation equipment, such as cyclone separators, bag filters, electrostatic precipitators, scrubbing devices, etc., for removing the last traces of entrained catalyst particles in the regeneration gases. As the hot regeneration gases are at a high temperature, it is preferred practice to pass the hot gasses through heat recovery equipment, such as a waste heat boiler, before passing the gases to the atmosphere.

Hot regenerated catalyst particles are withdrawn at a temperature of about 1050° F. to 1150° F. from the lower portion of the dense fluidized bed 156 through withdrawal pipe 172 which extends above the grid member 154 and which forms the upper portion of a standpipe 174. From the standpipe 174 a portion of the hot regenerated catalyst particles is passed through standpipe 16 for introduction into reaction zone 10 as above described, and another portion of the hot regenerated catalyst particles is passed through line 106 for passage to the second reaction zone 114 as above described.

Standpipe 16 is provided with a control valve 176 and standpipe 106 is provided with control valve 178 for controlling the rate of withdrawal of hot regenerated catalyst particles from the respective standpipes.

Fluidizing lines 182 are preferably provided for standpipes 174 and 106 for maintaining the catalyst particles in a dense fluidized liquid-like condition so that the particles or the mixture produces a hydrostatic pressure at the base of the standpipe 106. Other fluidizing lines for the introduction of fluidizing or aerating gas are provided at 184 for maintaining the solid particles in the standpipe 16 in a dense fluidized liquid-simulating condition so that the mixture produces a hydrostatic pressure at the base of the standpipe 16.

The following data illustrate that recycling of slurry oil, designated in this case as polymer oil, affects coke or carbon yields.

| Yields percent on Feed, Output Basis | No Polymer Oil Recycle | Polymer Oil Recycle (5% on Fresh Feed) |
|---|---|---|
| Volume percent 7# 90% @ 293° Aviation Gasoline | 20.8 | 20.3 |
| Volume percent Total C₄ | 15.7 | 15.6 |
| Butylenes | 6.1 | 5.4 |
| Volume percent C₄H₁₀ | 9.6 | 10.2 |
| Weight percent Dry Gas | 7.8 | 8.2 |
| Weight percent Carbon | 2.5 | 3.6 |

The above data illustrate that although recycling of the polymer oil results in a minor decrease in yields in aviation gasoline and butylenes, the most striking difference is in coke on carbon yields, the operation with polymer oil recycling showing about 1% more carbon yield.

This is a serious disadvantage in commercial operation.

In my process, the carbon yield, when recycling polymer oil, is reduced by virtue of the fact that it is decomposed by utilizing partially spent catalyst and the fresh gas oil is cracked over freshly regenerated catalyst, thereby reducing the carbon yield on the fresh gas oil constituting the major portion of the oil charged to the unit, and thus decreasing the overall carbon yield.

The two-reactor system shown in Fig. 1 may be utilized for cracking two different stocks under the optimum conditions of temperature and catalyst concentrations required for each. With this system, the reactors may be operated at different temperatures, different catalyst concentrations in the reactors and with different weight ratios of catalyst to oil charged to the reactors.

Data are supplied in the following table to illustrate the advantage of using a two-reactor system wherein two contiguous crude fractions can be simultaneously charged to the cracking system and conditions so chosen as to provide optimum results on each of the fractions by adjusting the conditions existing in the two reactors.

The following data are submitted on fluid catalyst cracking of a wide cut gas oil from West Texas crude using one reactor and cracking the components of this mixture when using two reactors. It will be noted that by the use of two reactors, the overall results are superior to those obtained when using only one reactor and charging both of the fractions as a mixture. For example, the aviation gasoline is appreciably higher when using two reactors.

| Number of Reactors, Charge Stock | One | Two | | |
|---|---|---|---|---|
| | Wide Gas Oil | Light Gas Oil | Heavy Gas Oil | Combination |
| Charge Stock Boiling Range, ° F | 450-1000 | 450-600 | | |
| Cracking Conditions: | | React. 1 | React. 2 | |
| Reactor Ave. Temp., ° F | 900 | 975 | 902 | |
| Wt. Ratio Cat./Oil | 13.5 | 19.0 | 9.2 | |
| Wt. Hourly Space Velocity | 3.0 | 3.0 | 3.6 | |
| Conversion of Charge, Volume Per Cent | 60.9 | 66.2 | 65.2 | 65.6 |
| Yields on Charge: | | | | |
| Aviation Gasoline | 29.0 | 26.8 | 34.1 | 31.0 |
| Volume Per Cent Butylenes | 8.5 | 8.4 | 8.2 | 8.3 |
| Volume Per Cent Iso-butane | 1.3 | 1.5 | 1.9 | 1.7 |
| Volume Per Cent Normal-butane | 5.7 | 9.1 | 5.2 | 6.9 |
| Total, Butanes and Butylenes | 15.5 | 19.0 | 15.3 | 16.9 |
| Cycle Gas Oil, Volume Per Cent | 39.1 | 33.8 | 34.8 | 34.4 |
| Carbon, Weight Per Cent | 6.9 | 4.9 | 5.3 | 5.1 |
| Gas (Excl. Butanes), Weight Per Cent | 7.5 | 14.4 | 7.6 | 10.5 |

Figure 2:
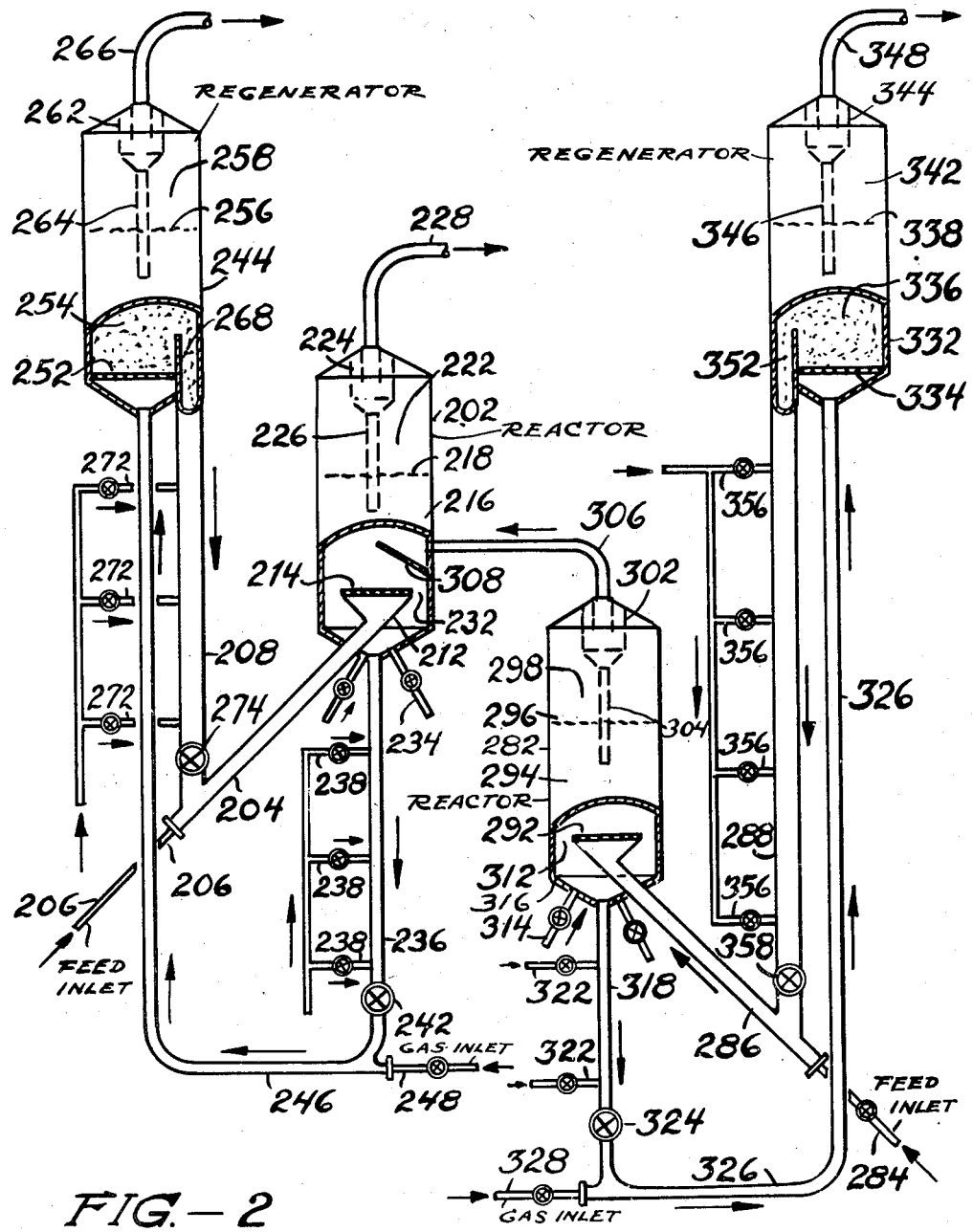
Fig. 2 represents another form of my invention in which separate types of catalyst or contact particles are used for the two contacting zones.

Referring now to Fig. 2, the reference character 202 designates a first reaction zone or vessel having a feed inlet line 204 into which fresh feed is introduced through line 206. The fresh feed is a virgin stock or other stock which is not very refractory. Hot regenerated catalyst or contact particles are introduced into line 204 from standpipe 208. The mixture is introduced into conical inlet member 212 having a perforated grid or plate member 214 for introducing the feed vapors and catalyst particles into the lower portion of the reaction vessel 202.

In the form of the invention shown in Fig. 2, two different types of catalyst are used with the more active catalyst being introduced into the first reaction zone 202. In the catalytic cracking of hydrocarbons, this catalyst comprises synthetic silica alumina gel which is more active than activated bentonite clays.

The velocity of the vapors flowing up through the reaction vessel 202 is selected to maintain the catalyst particles in a dense fluidized condition or bed as at 216 having a level at 218. Above the dense bed or mixture 218 is dilute phase or dilute suspension 222 comprising vaporous reaction products and entrained catalyst particles. The reaction products are passed through separating means 224 for separating most of the entrained catalyst particles from the vaporous reaction products. The separated catalyst particles are returned through line 226 to the dense bed or mixture 216 below the level 218 therein.

Vaporous reaction products pass overhead through line 228 and are preferably passed to a fractionating tower (not shown) which is similar to the arrangement shown in Fig. 1 for the separation of desired constituents from cycle oils and polymer oils contained therein.

The spent or partly spent catalyst particles are withdrawn from the dense bed or mixture 216 through stripping zone or section 232 in which the particles are stripped or purged by upflowing stripping gas. The catalyst or contact particles are maintained in a fluidized condition in the bottom of the first reaction vessel 202 by the introduction of fluidizing or aerating gas introduced through lines 234 below the conical inlet member 212. Sufficient gas may be introduced through these lines to provide the stripping gas for the stripping section 232. The fluidized spent catalyst particles are introduced into standpipe 236 provided with fluidizing lines 238 and control valve 242. The catalyst particles are maintained in a fluidized condition by the fluidizing gas introduced through lines 238 and the mixture produces a hydrostatic pressure at the base of the standpipe 236 which aids in moving the solid particles to a regeneration zone 244 arranged above the reaction zone 202.

Regenerating gas, such as air or other oxygen-containing gas, is introduced into line 246 through line 248 for admixture with the spent catalyst particles from the standpipe 236 which provides a lifting effect sufficient to move the catalyst particles into vessel 244. The suspension of spent catalyst particles in the regenerating gas is introduced into the bottom portion of the regenerator 244 below the perforated plate member or grid 252 arranged in the bottom portion of the regeneration zone or vessel 244.

The velocity of the regenerating gas is selected to maintain the catalyst particles in a dense fluidized liquid-simulating condition as at 254 having a level as at 256. The particles during regeneration are maintained in a turbulent and agitated condition so that the temperature throughout the regeneration zone or vessel is substantially uniform.

Above the dense mixture 254 is a dilute phase or dilute suspension 258 which comprises hot regeneration gases containing entrained catalyst particles. These hot gases are passed through separating means 262 preferably arranged in the upper part of the regeneration vessel 244 to separate entrained catalyst particles from the regeneration gases. The separated catalyst particles are returned to the dense bed 254 below the level 256 in the regenerator 244 through line or dip leg 264.

The hot regeneration gases pass overhead throught line 266 and may be treated to recover additional amounts of catalyst particles and heat in the same way as described in connection with Fig. 1.

Hot regenerated catalyst particles are withdrawn from the dense bed or mixture 254 through withdrawal pipe 268 which extends above the perforated plate member 252 in the regeneration vessel 244. The withdrawal pipe 268 forms the upper part of the standpipe 208 hereinbefore described. Fluidizing or aerating lines 272 are provided for the standpipe 208 for maintaining the catalyst particles in a dense fluidized liquid-simulating condition in the standpipe 208 so that the mixture produces a hydrostatic pressure at the base of the standpipe 208. The lower portion of the standpipe 208 is provided with a control valve 274 for controlling the rate of withdrawal of catalyst particles from the standpipe 208. The total hydrostatic pressure head corresponds to a height from valve 274 to the upper level 256 of the dense mixture in the regeneration zone 244.

A second reaction zone or vessel 282 is provided into which is introduced a less active catalyst and a more refractory stock. The feed stock may comprise cycle oil containing polymer oil separated from the vaporous reaction products leaving the first reaction zone 202 or it may comprise other refractory stocks or stocks which deposit a large amount of coke, carbonaceous material, or other catalyst contaminants on the catalyst particles thereby reducing their catalytic effectiveness. The feed, preferably as hot vapors, is introduced through line 284 and mixed with hot regenerated less active catalyst introduced into line 286 from standpipe 288. The mixture is introduced into a conical inlet member 288 arranged in the bottom portion of the second reaction zone 282. Conical inlet member 288 is provided with a perforated plate or grid member 292.

The catalyst used in this second reaction zone comprises a less active catalyst, such as acid-treated bentonite clays in divided form. The catalyst is maintained as a dense fluidized liquid-like bed or mixture 294 having a level indicated at 296 similar to that above described. The vaporous reaction products pass into the upper part of the second reaction zone 282 and form a dilute suspension or dilute phase indicated at 298 which comprises entrained catalyst particles suspended in the gas or vapors. The vaporization reaction products are passed through separating means 302 preferably arranged in the upper part of the second reaction zone 282 to separate a large amount of the entrained catalyst particles from the vapors. The separated catalyst particles are returned to the dense bed 294 below the level 296 in the reaction vessel 282 by the dip leg or return pipe 304.

The separated vaporous reaction products pass overhead through line 306 and are introduced into the lower portion of the dense bed or mixture 216 of the first reaction zone or vessel 202 to further crack the vapors introduced from the second reaction zone or vessel 282. A baffle plate or member 308 similar to baffle 132 in Fig. 1 is provided below the inlet of line 306 in the first reaction zone or vessel 202.

The reaction products passing overhead through line 306 contain some entrained less active catalyst fines (about 0–20 microns) but the amount is small and will be lost eventually from the system as dust so that it does not build up in the unit to contaminate the synthetic catalyst charged to reactor 202.

Spent or fouled catalyst particles from the second reaction zone 282 are withdrawn from the dense bed or mixture 294 through stripping zone or section 312 arranged below the grid member 292. Stripping and aerating gas is preferably introduced through lines 314 into the conical bottom 316 of the second reaction vessel 282 to maintain the catalyst particles in a fluidized liquid-like condition and also to strip out volatile entrained material.

The fluidized less active catalyst particles are introduced into standpipe 318 provided with fluidizing lines 322 for maintaining the catalyst particles in a dense fluidized condition in the standpipe 318 so that the mixture produces a hydrostatic pressure at the base of the standpipe 318. The hydrostatic pressure equals the head in the standpipe 318 plus the head of fluidized material 294 in the second reaction zone 282. This head aids in transfer of the catalyst particles to regenerator 332 in the same manner as disclosed in reference to Fig. 1.

Standpipe 318 is provided with control valve 324 for controlling the rate of withdrawal of catalyst particles from the second reaction zone 282. Regenerating gas, such as air or other oxygen-containing gas, is introduced into line 326 through line 328 for admixture with the spent or fouled catalyst particles from the standpipe 318. The less dense mixture is introduced into the bottom portion of a second regeneration zone 332 below the perforated plate member or grid member 334 arranged therein. The velocity of the gases is selected to maintain a dense fluidized liquid-like condition or mixture 336 having a level at 338.

Hot regeneration gases pass from the dense bed 336 into the dilute phase or dilute suspension 342 which comprises a dilute suspension of solid particles in the regeneration gas. The hot regeneration gases pass through separating means 344 preferably arranged in the upper part of the regeneration zone or vessel 332 to separate entrained catalyst particles from the regeneration gases.

The separated catalyst particles are returned through dip leg or return line 346 to the dense bed 336 below the level 338 in the regeneration zone 332. Hot regeneration gases pass overhead through line 348 and may be passed through further separating means and through heat recovery means as described in connection with the other regeneration zones above.

Hot regenerated catalyst particles are withdrawn from the bottom of the dense bed or mixture 336 through withdrawal pipe 352 which forms the upper part of standpipe 288 above described. Standpipe 288 is provided with fluidizing lines 356 for introducing fluidizing or aerating gas into the standpipe at spaced intervals to maintain the particles in a dense fluidized liquid-like condition. The standpipe 288 is provided with a control valve 358 at its lower end for controlling the rate of withdrawal of regenerated catalyst particles from the standpipe 288. The hydrostatic pressure produced at the base of the standpipe 288 is equivalent to the head from the valve 358 to the level 338 of the dense bed or mixture 336 in the second regeneration zone 332.

By using different catalysts in the unit shown in Fig. 2, the more expensive synthetic catalyst is more efficiently used and the less expensive treated clay catalyst is used for cracking less desirable charge oil stocks or stocks which rapidly degrade the catalyst activity.

Figure 3:
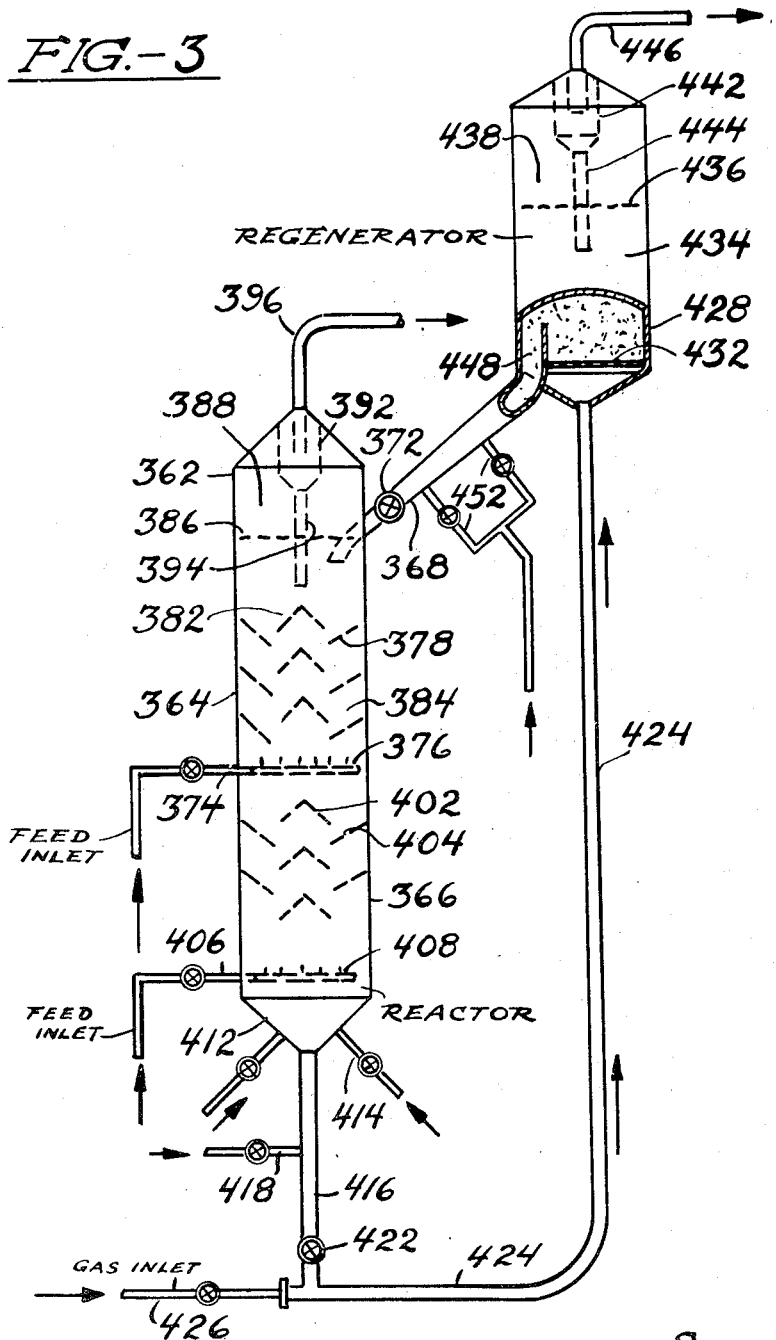
Fig. 3 represents another form of my invention in which the reaction vessel is provided with two conversion zones and the catalyst particles flow downwardly countercurrent to the upflowing hydrocarbon vapors.

Referring now to Fig. 3 of the drawings, the reference character 362 designates an enlarged reaction vessel comprising an upper reaction zone 364 and a lower reaction zone 366. Catalyst particles are introduced into the upper zone 364 from standpipe 368 having a control valve 372 for controlling the amount of catalyst introduced into the upper reaction zone 364. A stock fairly easy to crack, such as virgin oil vapors, is introduced through line 374 into the lower portion of the first or upper reaction zone 364 through a plurality of inlets 376.

The upper reaction zone 364 is provided with disc and doughnut baffles, the doughnut baffles being shown at 378 and the disc baffles at 382 to provide intimate contact between the upflowing vapors and the downflowing catalyst particles. The velocity of the vapors flowing upwardly through the first reaction zone is selected to maintain the catalyst particles in a dense fluidized liquid-like condition. The dense bed indicated at 384 has a level indicated at 386.

Reaction products in vapor form pass into the dilute phase 388 above the dense bed or mixture 384 and are passed through separating means 392 for separating catalyst particles from vaporous reaction products. The separated catalyst particles are returned by dip leg or return pipe 394 to the dense bed or mixture 384. Vaporous reaction products pass overhead through line 396 and may be passed to a fractionating system, such as shown in Fig. 1 for the separation of desired products from condensate or cycle oil or polymer oil.

The partially spent catalyst particles from the first reaction zone 364 then flow downwardly into the upper portion of the second or lower reaction zone 366 which is also provided with a disc and doughnut baffle construction, the discs being shown at 402 and the doughnuts at 404. The preheated feed for the lower reaction zone 366 is introduced into line 406 and is distributed across the area of the lower portion of the lower reaction zone by a plurality of sprays 408.

The feed for the lower reaction zone comprises a more refractory stock than the stock for the upper reaction zone. The feed may comprise cycle oil or polymer oil or other more refractory stocks or stocks which deposit a large amount of coke or carbonaceous material on the catalyst particles. The vaporous reaction products from lower reaction zone 366 pass upwardly into the lower portion of top reaction zone 362 and are further cracked by contact with the more active catalyst in reaction zone 362. The flow of the catalyst and vapors in lower reaction zone 366 is countercurrent.

The spent or fouled catalyst particles are passed from the bottom of the second reaction zone 366 into conical bottom 412 of vessel 362 from which they are withdrawn. Fluidizing or stripping gas is introduced into bottom 412 at one or more points as shown at 414. The aerating gas is preferably introduced in sufficient amount to act as a stripping gas for the spent or fouled catalyst particles withdrawn from the lower reaction zone 366.

The spent or fouled catalyst particles are passed to a standpipe 416 provided with one or more aerating lines 418 to maintain the particles in a fluidized liquid-like condition. The fluidized mixture produces a hydrostatic pressure at the base of the standpipe 416. The standpipe 416 is provided with a control valve 422 for regulating the rate of withdrawal of spent catalyst particles from the standpipe 416.

The spent or fouled catalyst particles are introduced into line 424 where they are mixed with regenerating gas introduced through line 426. The regenerating gas may comprise air or other oxygen-containing gas. The less dense mixture is introduced into the bottom of a regeneration zone 428 which is preferably arranged above the level of the reaction vessel 362. The less dense mixture is introduced below perforated grid or distribution plate 432 arranged in the bottom portion of the regeneration vessel 428. The velocity of the regenerating gas is selected to maintain the particles in a dense fluidized liquid-like condition shown at 434 with a level at 436.

Above the dense mixture 434 is a less dense mixture 438 comprising hot regeneration gases containing entrained catalyst particles. The hot regeneration gases are passed into a separating means 442 preferably arranged in the upper portion of a regeneration vessel 428 to separate solid particles from hot regeneration gases. The separated catalyst particles are returned to the dense bed or mixture 434 through dip leg or return pipe 444. The hot regeneration gases pass overhead through line 446 and may be further treated to separate entrained catalyst particles and to recover heat as above described in connection with Fig. 1.

Hot regenerated catalyst particles are withdrawn from the bottom of the dense bed or mixture 434 through withdrawal line or pipe 448 which extends above the distribution plate 432 in the regeneration zone or vessel 428. The withdrawal pipe 448 forms the upper part of the standpipe 368 above described. The standpipe 368 is provided with fluidizing lines 452 to maintain the particles in a dense fluidized liquid-like condition so that they develop a hydrostatic pressure at the base of the standpipe 368.

While I have shown several forms of my invention, it is to be understood that these are by way of illustration only and various changes and modifications may be made without departing from the spirit of my invention.

What is claimed is:

1. A process for treating hydrocarbon fluids which comprises contacting freshly regenerated catalyst particles in a first reaction zone with charging oil vapors consisting essentially of virgin stock, withdrawing vaporous reaction products overhead from said first reaction zone, separately withdrawing fouled catalyst particles from said first reaction zone and passing the withdrawn fouled particles to a second reaction zone wherein they are contacted with oil vapors of a higher coking nature than the charging oil, passing the total vaporous reaction products from said second reaction zone into said first reaction zone for further contact with the freshly regenerated catalyst particles therein, withdrawing spent catalyst particles from said second reaction zone, regenerating them and returning them to said first reaction zone.

2. A process according to claim 1 wherein part of the regenerated catalyst is mixed with the fouled catalyst leaving said first reaction zone and before introduction into the said second reaction zone.

3. A process for treating hydrocarbon fluids which comprises introducing hydrocarbon vapors of lower coking nature into the lower portion of a first reaction zone, introducing active catalyst particles into the upper portion of said first reaction zone so that the vapors flow upwardly countercurrent to the catalyst particles, withdrawing total vaporous reaction products overhead from said first reaction zone, flowing the fouled catalyst particles as a dense fluidized mixture from said first reaction zone into the upper portion of a second reaction zone directly beneath said first reaction zone and in communication therewith, introducing a higher coke forming hydrocarbon stock into the lower portion of said second reaction zone so that the higher coke forming vapors pass upwardly countercurrently to the downwardly moving fouled catalyst particles, passing the total vaporous reaction products from the upper portion of said second reaction zone into the bottom portion of the first reaction zone, withdrawing fouled catalyst particles from the bottom portion of said second reaction zone, passing the last mentioned fouled catalyst particles to a regeneration zone wherein the particles are regenerated and then returning the hot regenerated catalyst particles to the upper portion of said first reaction zone.

4. A process for cracking higher boiling hydrocarbon oils which comprises contacting hot freshly regenerated cracking catalyst particles with hydrocarbon oil consisting essentially of virgin gas oil stock in a first reaction zone maintained under cracking conditions, withdrawing vaporous reaction products from said first reaction zone, separately withdrawing fouled catalyst particles from said first reaction zone and passing them to a second reaction zone, passing oil vapors of a higher coking nature than the virgin stock through said second reaction zone for cracking the higher coking oil vapors, passing the total vaporous reaction products from said second reaction zone into said first reaction zone for further contact with the freshly regenerated catalyst therein, withdrawing spent catalyst particles from said second reaction zone, regenerating them and returning them to said first reaction zone.

LEONARD S. BONNELL.

REFERENCES CITED

The following references are of record in the file of this patent:

UNITED STATES PATENTS

| Number | Name | Date |
| --- | --- | --- |
| 2,235,133 | Zimmerman | Mar. 18, 1941 |
| 2,296,722 | Marancik et. al. | Sept. 22, 1942 |
| 2,324,165 | Layng et. al. | July 13, 1943 |
| 2,339,874 | Nysewander | Jan. 25, 1944 |
| 2,345,128 | Karpi | Mar. 28, 1944 |
| 2,349,574 | Conn | May 23, 1944 |
| 2,356,697 | Rial | Aug. 22, 1944 |
| 2,358,888 | Thomas | Sept. 26, 1944 |
| 2,378,531 | Becker | June 19, 1945 |
| 2,379,159 | Kanhofer | June 26, 1945 |
| 2,379,966 | Johnson | July 10, 1945 |
| 2,388,055 | Hemminger | Oct. 30, 1945 |
| 2,416,608 | Brackenbery | Feb. 25, 1947 |